Patented Aug. 28, 1934

1,972,066

UNITED STATES PATENT OFFICE

1,972,066
COATED FERROUS WELDING WIRE

Harry R. Pennington, Los Angeles, Calif., assignor to Indiana Steel & Wire Company, Muncie, Ind., a corporation of Indiana No Drawing. Application April 30, 1931, Serial No. 534,139

3 Claims. (Cl. 219—8)

The present invention relates to flux coated ferrous welding electrodes. Various means have been provided for improving the quality of the weld formed by the deposition of metal from ferrous electrodes by the electric metallic arc process. Such ferrous electrodes are usually in the form of wire. In some instances, ferrous electrodes of special composition have been employed; in others the ferrous electrode has been provided with a coating to form a protective molten slag. There are other coatings which include ingredients intended to stabilize the arc; and still others which are intended to produce gases at the arc.

Coatings in common use on ferrous electrodes comprise essentially the combination of sodium silicate and calcium carbonate. To these additional ingredients are sometimes added. Difficulties that have been encountered with such coatings are that the coating retains or takes up moisture. If thoroughly dried, the coating is made fragile and the electrode cannot be appreciably bent without scaling of the coating. Furthermore, they are deliquescent. Such coatings are not impervious to moisture and are liable to disintegration by becoming damp or wet in transit or in storage. Also the present type of coatings now in use do not give all of the desired results. For example, in welding in vertical or overhead positions, the electrode metal tends to sag or flow from where it is directed. In many instances of overhead welding, much of the metal actually becomes detached, falling from the weld. This appears to be due to the metal being expelled in large globules which retain their heat and flow or drop before cooling sufficiently to adhere to the cooler base metal. When the metal is expelled in minute particles, it condenses or solidifies quickly to the surface of the colder base metal, thus adhering without sagging or dropping. The provision of a stratified coating having an outer layer of material sealed to moisture has been proposed and lacquer has been successfully used for this purpose. However, the preparation of such coated electrodes involves two coating operations.

The object of this invention is to provide on ferrous welding electrodes a single homogeneous electrode coating which will produce an improved weld and when gasified or liquified by the arc heat has the following functions: First, to provide arc stability and concentration. Second, to produce a non-oxidizing atmosphere around the arc to protect the electrode metal in traversing the arc, as during this period the metal is in a highly heated state and in minute particles and is extremely susceptible to adverse effects of atmospheric gases. Third, to provide further protection to the deposited weld metal, the coating being composed of ingredients to produce a liquid slag which will exclude the surrounding air while the weld metal is in a molten or semi-molten state.

Another object of this invention is to provide on ferrous welding electrodes an electrode coating having the features described above and which will contain no moisture and will be moisture and water proof. A further object of this invention is to provide a coating which upon drying will not be fragile and become detached in handling, permitting the electrode to be sprung or bent without scaling.

As before stated, ferrous electrodes have been produced having a coating of sodium silicate and calcium carbonate and an additional coating of lacquer applied over the underlying flux coating as a protection against external moisture. The sodium silicate so used is initially applied in liquid form. In my invention, I use a lacquer as a binder, desirably as the sole binder and without using any liquid sodium silicate, since the sodium silicate appears to trap slag and gases in the weld metal and for other reasons later to be disclosed.

In compounding the coating comprising the present invention, a flux consisting of calcium carbonate, powdered silica flour, powdered soda ash and powdered carbon is prepared. The above powders are thoroughly and intimately mixed, and are put into and thoroughly mixed through a solution of a lacquer which serves as a binder. The lacquer which I prefer is nitro-cellulose lacquer, and some of my claims are limited to that; but in certain broader aspects of my invention, the lacquer may be a spirit gum lacquer, or shellac. The lacquer-binder will be decomposed by the heat of the arc, to form non-oxidizing gases. This mixture of materials in the lacquer is applied to a ferrous electrode which has previously been rendered free from oil and grease or rust, by chemical or mechanical means. The coating may be applied by any of the well known methods such as dipping, wiping, or brushing; and is allowed to dry, to produce on the electrode a solid coating which consists of the intimate mixture with the shellac and the powdered carbon of the calcium carbonate, powdered silica flour, and soda ash in suitable proportions to form a calcium-sodium glass when the electrode is subjected to the heat of the arc.

The thickness of the coating will vary with the cross section of the electrode and its composition.

In the use of a ferrous electrode thus prepared, its operation and the reaction of the flux may be described as follows: the use of a lacquer as described, as a binder, renders the coating impervious to moisture, and by thoroughly mixing the powders described into and through the lacquer in the proper proportion, and allowing the mixture to thoroughly dry, the disintegration of the lacquer binder which occurs on heating is retarded until such binder actually comes in contact with the arc. The non-oxidizing gases thus produced by progressive decomposition of the mixed-in lacquer as the ferrous wire is melted, at the high temperature involved in ferrous welding, aid to protect the ferrous metal in the arc from atmospheric gases. This is in sharp contradistinction to the effect obtained when the lacquer is applied as an outer coating to an underlying flux coating, as then it is decomposed prematurely.

A further neutral or non-oxidizing atmosphere is created by the expelling of carbon dioxide due to the decomposition of calcium carbonate and sodium carbonate; in the presence of silica producing a resultant liquid slag of calcium-sodium silicate. In other words, the high temperature of the arc incident to ferrous welding is utilized to form calcium sodium silicate. The preference of this manner of forming the liquid slag lies in the beneficial effect of the gas expelled in the fusion and decomposition of the ingredients. Also it permits the use of a wide range of soda ash, calcium carbonate and silica to form a resultant slag and gases best suited to the ferrous metal electrode being used to produce a weld practically free from slag porosity and occluded gas. A further important desirable function of my coating mixture is that it produces conduction gases to sustain the arc. The conduction gases are expelled at the arc on decomposition of the coating elements and possibly by the production of metallic calcium.

A stable arc is assured by the coating and the electrode metal is expelled in a series of uniform minute globules resulting in thorough fusion and a smooth sound weld. The carbon element of the coating aids in this effect; also to insure proper depth of fushion of the electrode metal to the base metal.

A preferred and specific embodiment of my invention comprises mixing the following ingredients in the proportions by weight specified: Calcium carbonate seventy-five per cent, silica flour ten per cent, soda ash ten per cent, and carbon powder five per cent. The carbon powder is preferably made from charcoal because of the relatively high temperature at which it volatilizes.

The above mixture is then added to a nitrocellulose lacquer thinned to suitable consistency, desirably in the proportion of two pounds of the mixture to two quarts of thinned lacquer. The coating is applied by a special machine which wipes the coating on the ferrous metal electrode, which electrode may be in the form of wire and unwound from a reel. The coating is allowed to dry, and the finished coated electrode may be made into coils or cut in lengths, as desired.

Under the action of the heat of the arc, the silica flour reacts with the soda ash and the calcium carbonate to set free carbon dioxide and to form calcium-sodium silicate or silicates, to make a glass slag of a character depending upon the proportions of ingredients used. Both the carbon dioxide and the glass slag protect the metal, not only that of the electrode and that in the arc but that which is deposited on the work. The carbon dioxide is a non-oxidizing gas enveloping the welded ferrous metal.

Anhydrous sodium silicate may be substituted for the ingredients silica flour and soda ash. The lacquer acts as a vehicle or binder for the mixture.

The ferrous welding electrode produced may be wound in coils or on reels for use in automatic welding. This enables the wire to be fed from the reel to the arc through an automatic feed.

It is obvious that various changes may be made in the proportions and ingredients as will occur to those skilled in the art and within the scope of the appended claims.

What I claim is:—

1. A welding electrode having a ferrous core and a coating impervious to moisture; said coating comprising a lacquer serving as a binder and ingredients uniformly dispersed therethrough including a metal carbonate and silica flour in the approximate proportions by weight eight units of the metal carbonate and one of silica flour.

2. A welding electrode having a ferrous core and a coating impervious to moisture; said coating comprising lacquer as a binder and ingredients uniformly dispersed therethrough including calcium carbonate, soda ash and silica flour in the approximate proportions by weight; seventy five per cent calcium carbonate, ten per cent soda ash, ten per cent silica flour, and the remainder volatilizable non-oxidizing substances.

3. A welding electrode having a ferrous core and a coating impervious to moisture; said coating comprising lacquer as a binder and ingredients uniformly dispersed therethrough including calcium carbonate, soda ash and silica flour in the approximate proportions by weight, seventy five per cent calcium carbonate, ten per cent soda ash, ten per cent silica flour, and five per cent carbon flour.

HARRY R. PENNINGTON.